United States Patent
Lo (10) Patent No.: US 6,738,804 B1
(45) Date of Patent: May 18, 2004

(54) METHOD AND APPARATUS FOR ENABLING SECTORED DATA REFRESHING OF WEB-SITE DATA DURING SESSION

(75) Inventor: Bruce Lo, Redwood City, CA (US)

(73) Assignee: Yodlee.com, Inc., Redwood City, CA (US)

( * ) Notice: Subject to any disclaimer, the term of this patent is extended or adjusted under 35 U.S.C. 154(b) by 761 days.

(21) Appl. No.: 09/663,871

(22) Filed: Sep. 15, 2000

Related U.S. Application Data (63) Continuation-in-part of application No. 09/663,817, filed on Sep. 15, 2000.

(51) Int. Cl.$^7$ .............................. G06F 15/16; G09G 5/00
(52) U.S. Cl. ...................... 709/219; 345/733; 345/765; 345/767; 345/784; 345/794; 709/217
(58) Field of Search ................................ 345/733, 764, 345/765, 767, 771, 784–787, 794–796; 709/217, 219

(56) References Cited

U.S. PATENT DOCUMENTS

| | | | |
|---|---|---|---|
| 5,946,697 A | * | 8/1999 | Shen .......................... 715/513 |
| 6,144,991 A | * | 11/2000 | England ...................... 709/205 |
| 6,188,400 B1 | * | 2/2001 | House et al. ................ 345/805 |
| 6,209,007 B1 | * | 3/2001 | Kelley et al. ................ 715/513 |
| 6,272,493 B1 | * | 8/2001 | Pasquali ...................... 707/10 |
| 6,389,437 B2 | * | 5/2002 | Stoub .......................... 715/523 |
| 6,414,697 B1 | * | 7/2002 | Amro et al. ................. 345/772 |
| 6,434,563 B1 | * | 8/2002 | Pasquali et al. .............. 707/10 |
| 6,538,673 B1 | * | 3/2003 | Maslov ........................ 345/853 |
| 6,549,220 B1 | * | 4/2003 | Hsu et al. .................... 345/854 |
| 6,570,595 B2 | * | 5/2003 | Porter .......................... 345/802 |
| 2003/0067480 A1 | * | 4/2003 | Gao et al. .................... 345/733 |

OTHER PUBLICATIONS

Douglis, Fred et al. "HPP: HTML Macro–Preprocessing to Support Dynamic Document Caching", USENIX Symposium on Internetworking Technologies and Systems, Dec. 1997, 13 pages.* irt.org. "Q616 How can I resize a child when a new image is loaded into it?", publicly posted Jun. 19, 2000, <http://web.archive.org/web/20000619807​31/http://developer.irt.org/script/616.htm>, 1 page.*

* cited by examiner

*Primary Examiner*—David Wiley
*Assistant Examiner*—George Neurauter, Jr.
(74) *Attorney, Agent, or Firm*—Donald R. Boys; Central Coast Patent Agency Inc.

(57) ABSTRACT

A browser-control script for controlling how refreshed data is rendered during a network data-session is provided. The browser control script comprises an instruction for establishing a second data-channel between a client and a data source, a data-communication function for transacting data over the second data-channel, an instruction for enabling selective data-rendering by the browser application, a selection function for selecting data elements to be refreshed and an instruction for predicting a new scroll position in a browser window. Once invoked, the browser-control script provides an automated control-routine for managing a data-refresh operation such that data re-rendering within the browser application only occurs when there are updated data elements ready for display, the re-rendering of the data specific to the updated data elements.

19 Claims, 5 Drawing Sheets

METHOD AND APPARATUS FOR ENABLING SECTORED DATA REFRESHING OF WEB-SITE DATA DURING SESSION

CROSS-REFERENCE TO RELATED DOCUMENTS

The present invention is a continuation-in-part (CIP) to the co-pending U.S. patent application Ser. No. 09/663,817, entitled "Method and Apparatus for Efficient Data Refreshing of Web-site Data During Session", which was filed on Sep. 15, 2000, and which is incorporated herein in its entirety.

FIELD OF THE INVENTION

The present invention is in the field of navigation and data gathering on a data-packet-network and pertains more particularly to methods and apparatus for refreshing data associated with a Web site during a client/server session.

BACKGROUND OF THE INVENTION

The information network known as the world wide web (WWW), which is a subset of the well-known Internet, is arguably the most complete source of publicly-accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

A larger percentage of the general population than ever before now has access to the Internet. Companies have responded to this increase in user-ship by providing more dynamic Web content available through an ever-increasing number of WEB-sites. Stock quotes, Banking information, Mortgage information, Travel information, and Purchase information are just a few examples of relevant dynamic content now available to users accessing the Internet. Dynamic content, as referred to in this specification, refers to content that is continually updated as new information becomes available.

According to prior art, such dynamic content described above is updated using a request/response model consistent with hypertext-transfer-protocol (HTTP). Therefore, it is typical that no unsolicited refreshed data is sent from a server to a client. That is to say that a refresh is a user-initiated action and although there may be new data available, a user will not receive it unless it is requested.

In order to get around the traditional request/response model, companies have provided a variety of client-side solutions that may be used to set-up a data-push scenario wherein any new data is pushed to a client at time of log-in or when it becomes available during a data session. Using a push model, client browser windows may be updated with content periodically and automatically without a client making a request for the data.

In both cases described above, a browser window utilized to display old data must be dedicated for the purpose of rendering the refresh data, either pushed to or requested by a user. In these instances of data refresh, there exists a period of time when the refresh window (browser window) appears blank because the old data is being replaced with not yet completely downloaded new data.

Depending on the nature of the refresh operation and the requirements of the refresh server, this period of time can be relatively extensive and can cause user discomfort marked by impatience. For example, if there is considerable server-side processing of refresh data, then a refresh operation may eventually time out and may have to be re-initiated. Even when a request response is generated before a time-out condition occurs, the period of time required for waiting at the client end can still be prolonged. Moreover, a network connection opened from a server to a client is under utilized during a period of server processing of a refresh request.

Another problem with a traditional refresh transaction is that typically, all original data displayed in a window before refreshing is replaced by refreshed data. This fact causes un-necessary processing at both the server end and at the client end. Bandwidth is therefore wasted to a variable extent, depending on the nature of the refresh and the data elements being refreshed. Currently, there is no mechanism in prior art for enabling a user to choose individual data elements among general content for refresh unless separate windows and channels are devoted for the separate data elements.

A system known to the inventor utilizes a browser-control script for controlling how refreshed data is rendered during a network data-session. The browser-control script comprises an instruction for establishing a second data-channel between a client and a data source, a data-communication function for transacting data over the second data-channel, an instruction for directing the data-rendering function of the browser application, and in some cases a selection function for selecting data elements to be refreshed. Once invoked, the browser-control script provides an automated control-routine for managing a data-refresh operation such that data re-rendering within the browser application is prevented from occurring until all refreshed data is ready to be displayed. In a preferred application, the control script is a Java Script program that is provided and embedded within Web content on a Web page.

The inventors have discovered that further efficiency may be achieved over what is accomplished by the above-described system. Often, an electronic information page (Web page) contains separate data elements that represent aggregations or summaries of data obtained for a requesting user from a plurality of separate network sources. For example, many personalized Web pages are configurable such that information from the plurality of sources may be presented in a single page in sectored fashion. For example, a user may configure a personal page to display news articles from a separate news source, sports articles from a separate sports page, movie times from a specific locality, and so forth. This service is typically performed by populating a special on-line form that instructs the server what data to provide on the personalized interface.

A system known to the inventor provides this service in a way that allows a user to add any type of data from virtually any type of Web-site to his or her personal Web page, termed a personalized portal page, by the inventor. In either case, conventional refresh methods require that all of the Web-data on the Web page be re-rendered if an update is requested.

The browser-script refresh system described in the patent application to which the present application is a CIP provides an ability to re-render the data such that the re-rendering does not occur until all of the refreshed data is ready to be displayed. The conventional refresh option available in most browser applications is bypassed by this method.

A user practicing the art taught in the priority specification may, in some cases, still be inconvenienced by a data re-rendering resulting from a refresh request. This inconvenience may occur if a user is engaged in viewing or reading content during the time a re-rendering occurs. A specific data element being read by a user may shift position or suddenly change in content as a result of refreshed and unchanged data being re-rendered in the viewing window. Shifting of original content may occur if a block of new data in a section requires more real estate than the replaced block. Of course, if it happens that the specific block of data that the user is viewing is subject to update, the content suddenly changes during re-rendering. In either case, a full data re-rendering occurs and the browser window is void of data for the period of time required to load the new Web page. If a user's PC is state-of-the-art with a fast processor, loading the Web-page from cache may occur so quickly that a user does not notice any inconvenience. However, in some cases, wherein a user is operating a less powerful machine, the re-rendering of data may still produce a momentarily blank window, which may be distracting.

What is clearly needed is a method and apparatus that enables a user to refresh data in a sectored fashion wherein only updated data specific to requested data-elements is re-rendered in a viewing window during the refresh operation, and wherein the viewing window remains unaltered with respect to position of original content being viewed by a user at the time of data rendering. Such a method and apparatus would eliminate page shifting as a result of updated data blocks being different in size than original data blocks thereby allowing a user to view content in an uninterrupted fashion during the refresh operation.

SUMMARY OF THE INVENTION

In a preferred embodiment of the present invention, a browser-control script for controlling how refreshed data is rendered during a network data-session is provided. The browser control script comprises an instruction for establishing a second data-channel between a client and a data source; a data-communication function for transacting data over the second data-channel; an instruction for enabling selective data-rendering by the browser application; a selection function for selecting data elements to be refreshed and an instruction for predicting a new scroll position in a browser window. Once invoked, the browser-control script provides an automated control-routine for managing a data-refresh operation such that data re-rendering within the browser application only occurs when there are updated data elements ready for display, the re-rendering of the data specific to the updated data elements.

In preferred applications, the control script is of the form of an embedded executable program embedded into a Web page. Also, in preferred applications, the network utilized is the Internet network and the control script is a Java Script program.

In one embodiment, the data source is a network-connected Web server. In another embodiment, there is more than one data source from whence data is compiled and aggregated by a single network-connected Web server.

In one aspect, the instruction for predicting a scroll position contains an action for shifting the scrolled position when an updated data element is re-rendered above a user's viewing position in the browser window. In this aspect, the control-script obtains size information of updated data elements during transmission of the data elements from the server to the client. In a variation of this aspect, the size information of updated data elements is obtained from client cache memory after receipt of the updated data elements but before rendering the elements.

In another aspect of the present invention, a method for conducting the data-refresh operation during an active data session conducted over a data network is provided. The method comprises the steps of: (a) establishing a second data channel between a client and a data source operating on a network using a first data channel; (b) sending a data-refresh request from the client to the data source over the second data channel; (c) instructing the browser application to continue display of the original content received over the first data channel while the data-refresh request is in process; (d) receiving updated data sent from the data source to the client over the second data channel; (e) determining a new scroll position for data to be displayed; and (e) instructing the browser application to render the updated content only after new content is received and renderable.

In a preferred embodiment, the method is practiced on the Internet network. In all aspects of the method in step (a), the second data channel is used for background data transactions. In preferred aspects of the method in step (a), the second data channel is established by virtue of invoking an executable control icon embedded within the original Web content. In preferred applications of the method in steps (c) and (e), instruction is Java Script executed by invoking the control icon and in step (a), the data source is a network-connected Web server and the data is of an HTML class of data.

In another aspect of the above described method, a step is added for querying the data source over the second data channel, the query related to the status of a request in process and in step (a), there is more than one data source from whence data is compiled and aggregated by a single network-connected Web server. In yet another aspect of the method, a step is added for predicting the size of updated data elements and shifting the scrolled position of the browser window during data re-rendering in the event that the re-rendering occurs above the user's viewing position.

Now, for the first time, a method and apparatus is provided that enables a user to refresh data in a sectored fashion wherein only updated data specific to requested data-elements is re-rendered in a viewing window during the refresh operation and wherein the viewing window remains un-altered with respect to position of original content being viewed by a user at the time of data rendering. Such a method and apparatus eliminates page shifting as a result of updated data blocks being different in size than original data blocks and thereby allows a user to view content in an un-interrupted fashion during the refresh operation.

DESCRIPTION OF THE PREFERRED EMBODIMENTS

Figure 1A:
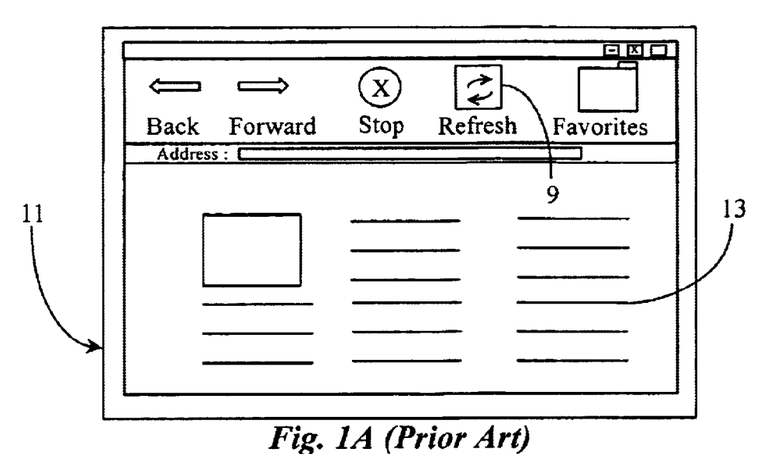
FIG. 1A is a plan view of a browser window displaying original Web content before a refresh operation according to prior art.
Figure 1B:
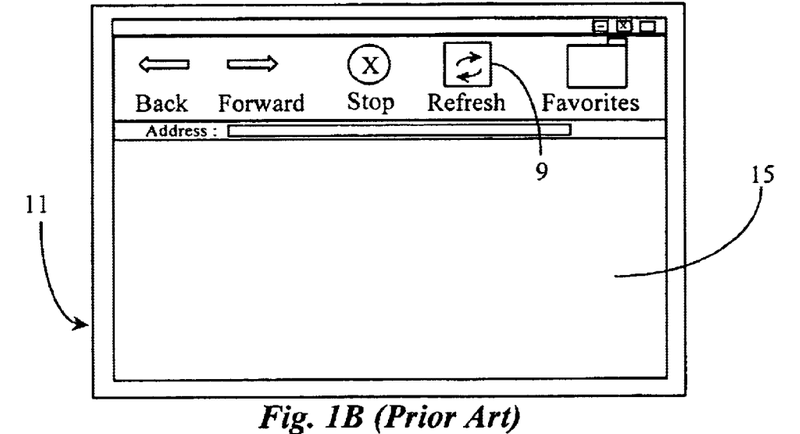
FIG. 1B is a plan view of the browser window of FIG. 1A experiencing a blank-out period during a refresh request process.
Figure 1C:
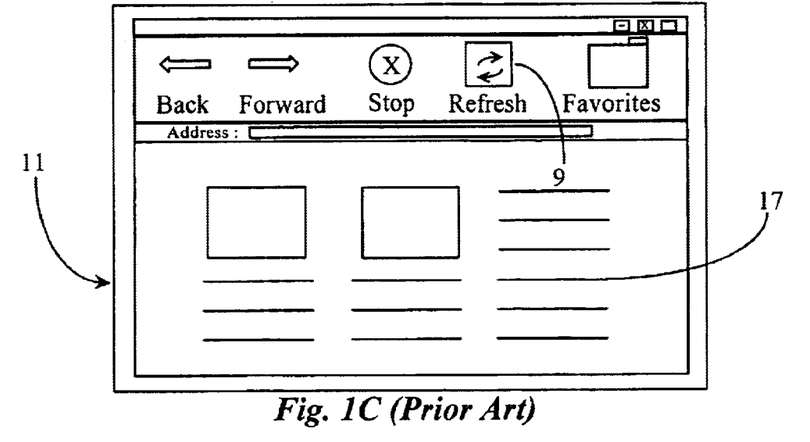
FIG. 1C is a plan view of the browser window of FIG. 1A displaying refreshed content after a refresh operation according to prior art.

As previously described in the background section, prior art methods for refreshing data over a data-packet-network are somewhat limited in efficiency. This is especially so when a client is connected to a data source using typical modem-phone line connection methods as is most common. A prior-art data-refresh operation is illustrated in a prior-art example of using a standard refresh option available with most browser applications. FIGS. 1A–1C illustrate this singular data-refresh operation according to prior art.

Referring now to FIG. 1A, a plan view of a Web-browsing window 11 is illustrated as open and engaged in a current session over a DPN, which in this example, may be assumed to be the well-known Internet network. A client, operating window 11, may be assumed to be operating a personal computer (PC) connected to the Internet and communicating with a data source, which may be assumed to be a Web-server (WS) hosted by a company providing a service to the user. As is known in the art, the described WS provides Web content that is downloaded and displayed within window 11. Such Web content is illustrated herein as Web content 13.

Some, but not all, of the typical Web-browsing controls are illustrated in window 11. One with skill in the art of network navigation will recognize that there are many more options available with typical browsing windows than are illustrated herein. The Inventor chooses to illustrate only basic function for the sake of simplicity. A refresh button 9 is illustrated among other standard browser options. There are a back button, a forward button, a stop button and a favorites button. A typical Web-address block is illustrated directly beneath the illustrated user-options.

Refresh button 9 is typically invoked in order to send a request to the content-providing WS for updating content 13 currently displayed within window 11. Any Web-content may be updated for a latest version by clicking on refresh button 9. Invocation of refresh button 9 may be initiated by a user in a case wherein all of Web content 13 did not display originally. Another case may be if Web content 13 is dynamic, meaning that it is frequently updated. In this case, there may be a user-instruction provided along with content 13 that alerts a user to invoke refresh button 9 to get the latest content 13. In some cases, periodic refresh operations are automatic and occur periodically as instructed by a content-providing server.

Referring now to FIG. 1B, a user has invoked refresh button 9 and a connected WS is in the process of refreshing Web content 13. A blank display, illustrated herein by element number 15, is a direct result of the processing of a refresh operation. Regardless of the previous content displayed within window 11, browser window 11 blanks immediately in order to make way for incoming refreshed data content. It is noted herein that during a refresh operation, all of the data originally displayed will be replaced whether or not any of the replacement data is actually new data. The new version of the entire Web page reloads.

The period of time expiring during processing of a refresh request may be considerable as described in the background section. There is more than one variable that can affect the time frame during a refresh operation wherein display window 11 will be void of content. For example, the processing speed of a client's machine is one variable. The rate of data-transfer over a user's Internet connection is another variable. Still other variables include the amount of internal processing required of the WS to complete a refresh request. This may be affected diversely if a WS must check for and obtain data from other network servers in order to complete a refresh request. Even if all of the refresh data exists locally at the connected WS, considerable time may elapse if there is much computation required to formulate results. Therefore, blank display 15 may exist for undesirable periods of time, perhaps, irritating a user and causing impatience. This fact is especially true when a WS is compiling data from several sources and aggregating the data for presentation in a single Web page.

Referring now to FIG. 1C, window 11 is illustrated in a state after a successful data-refresh operation. New Web content 17 finally appears within browser window 11 in the form of new and refreshed data. However, all of content 13, described in FIG. 1A is replaced by content 17 whether or not any new data was actually included in the refresh operation as was described above. In this case, it can be seen that content 13 illustrated in FIG. 1A prior to refresh is visibly different than content 17 illustrated herein indicating that new data was available. However, much of the data displayed as content 17 may be unchanged data originally rendered as content 13, which was discarded in FIG. 1B. Therefore, bandwidth and processing time is not utilized efficiently in this prior-art example of a refresh process.

Figure 2A:
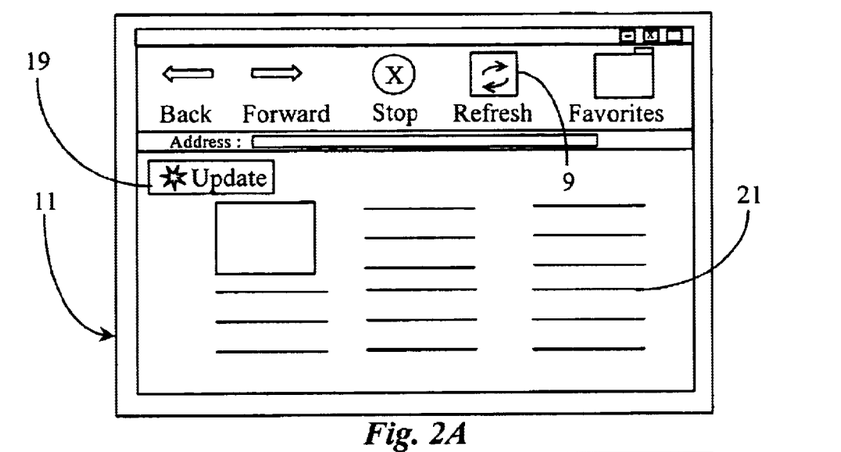
FIG. 2A is a plan view of a browser window displaying content enhanced with a dynamic refresh link according to an embodiment of the present invention.
Figure 2B:
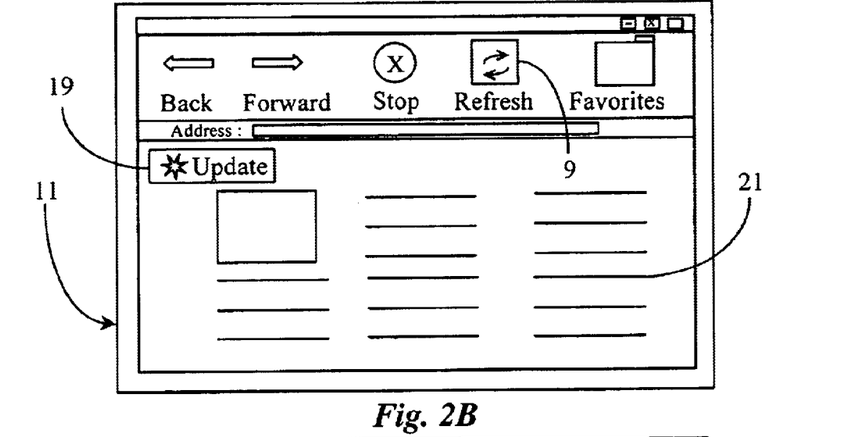
FIG. 2B is a plan view of the browser window of FIG. 2A during a refresh operation displaying original content according to an embodiment of the present invention.
Figure 2C:
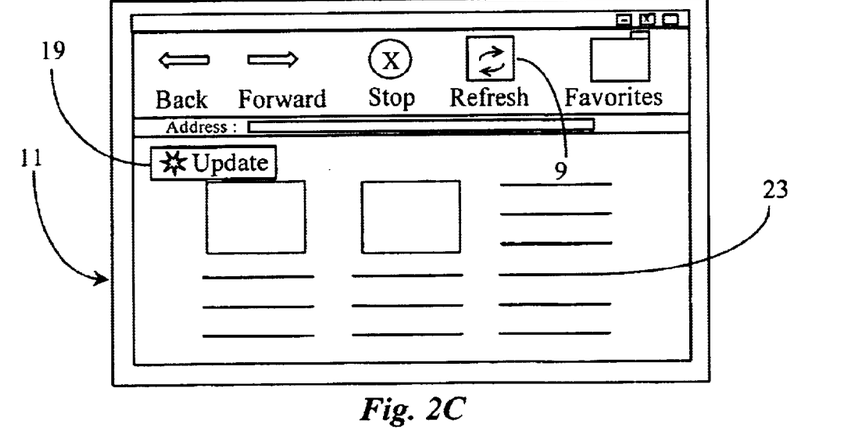
FIG. 2C is a plan view of the browser window of FIG. 2A after a refresh operation has completed displaying new Web content according to an embodiment of the present invention.

FIGS. 2A–2c illustrate a data-refresh operation according to a preferred embodiment of the present invention. Referring now to FIG. 2A, window 11 may be assumed, in this example, to be analogous to window 11 of prior-art description in that user controls, including refresh button 9, are present and retain their prior-art functionality. That is to say that invoking refresh button 9 in this example would produce the same results described in FIGS. 1A–1C.

According to a preferred embodiment of the present invention, a unique browser script, illustrated herein as an interactive update icon 19, is provided and embedded into original Web content, illustrated herein as Web content 21. Script 19 is, in a preferred embodiment, a java-based browser instruction that is adapted to enable a second data or refresh channel to be opened between a client and the WS and to instruct browser window 11 how to render updated data content downloaded over the second channel.

In one embodiment of the present invention, script 19 is utilized in a Web page that provides data from a plurality of sources. A Web page such as this may be a personalized Web page from which a subscribing user may view aggregated summary data. In this case, the entity hosting Web content 21 may be the same entity that provides and installs script 19. In another embodiment of the present invention, script 19 may be provided by one entity for utilization in virtually any Web site hosted by another entity whether updated material comes from disparate Web sources or not.

Script 19, as described above, is a java-based program that is actually downloaded with Web content in which it is embedded. However, other Web-based functional languages may be used to create and implement script 19. In this example, script 19 is illustrated as an executable icon, which is viewable, in this case, at the beginning of downloaded Web content 21. A user invokes script-icon 19 whenever he or she wishes to receive an update to Web content 21 during an active session.

Referring now to FIG. 2B, script 19 contains an instruction for opening a separate data channel to the content-providing WS for the purpose of processing a refresh request. The purpose for opening a separate channel is in order to avoid the typical processing distraction experienced by a user when invoking a prior-art refresh button as was described above. By opening a second channel to a content-providing WS, refresh data is downloaded to a client station in the background (over the second channel) while a user views the old data. Script 19 further instructs browser 11 not to re-render any new data until all of the refresh data has been processed and downloaded to the client station. In this way, a re-rendering of refresh data occurs almost simultaneously with flash-out of the old data (21) of browser window 11. In this example, browser 11 is only blank for an instant therefore, Web content 21 is illustrated as still visible to a user during the processing of a re-fresh request initiated through interaction with icon 19.

Referring now to FIG. 2C, browser window 11 has new content 23 rendered thereto after a successful refresh utilizing icon 19. In this example, all of the data (content 21) originally rendered in FIG. 2A and still visible in 2B is completely replaced with new content 23. However, script 19 instructs browser 11 not to re-render new data until it is completely downloaded over the second data channel opened by virtue of using icon 19. In this way, the data re-rendering causes very little or virtually no delay wherein a user is concerned. A user with a significantly powerful PC may not even notice the re-rendering of data.

It will be apparent to one with skill in the art that icon 19 may be provided and embedded anywhere within data content without departing from the spirit and scope of the present invention. Furthermore, icon 19 may be adapted to take the place of normal refresh button 9 in its position on a browser tool-bar, perhaps installing itself there after an initial download and display of an original Web-page containing the embedded instruction. In this case, a visual indicator may be employed to change the look of a normal refresh button that is enhanced with the new functionality. There are many possibilities.

In one embodiment, script-icon 19 may be adapted to be user-configured for periodic re-fresh operations. In this embodiment, a user may, perhaps, right click on icon 19 thereby invoking a configure window that provides a user with a drop-down, or other type of option list wherein time periods may be selected and applied. Similarly, other user configure techniques may be employed.

Figure 3:
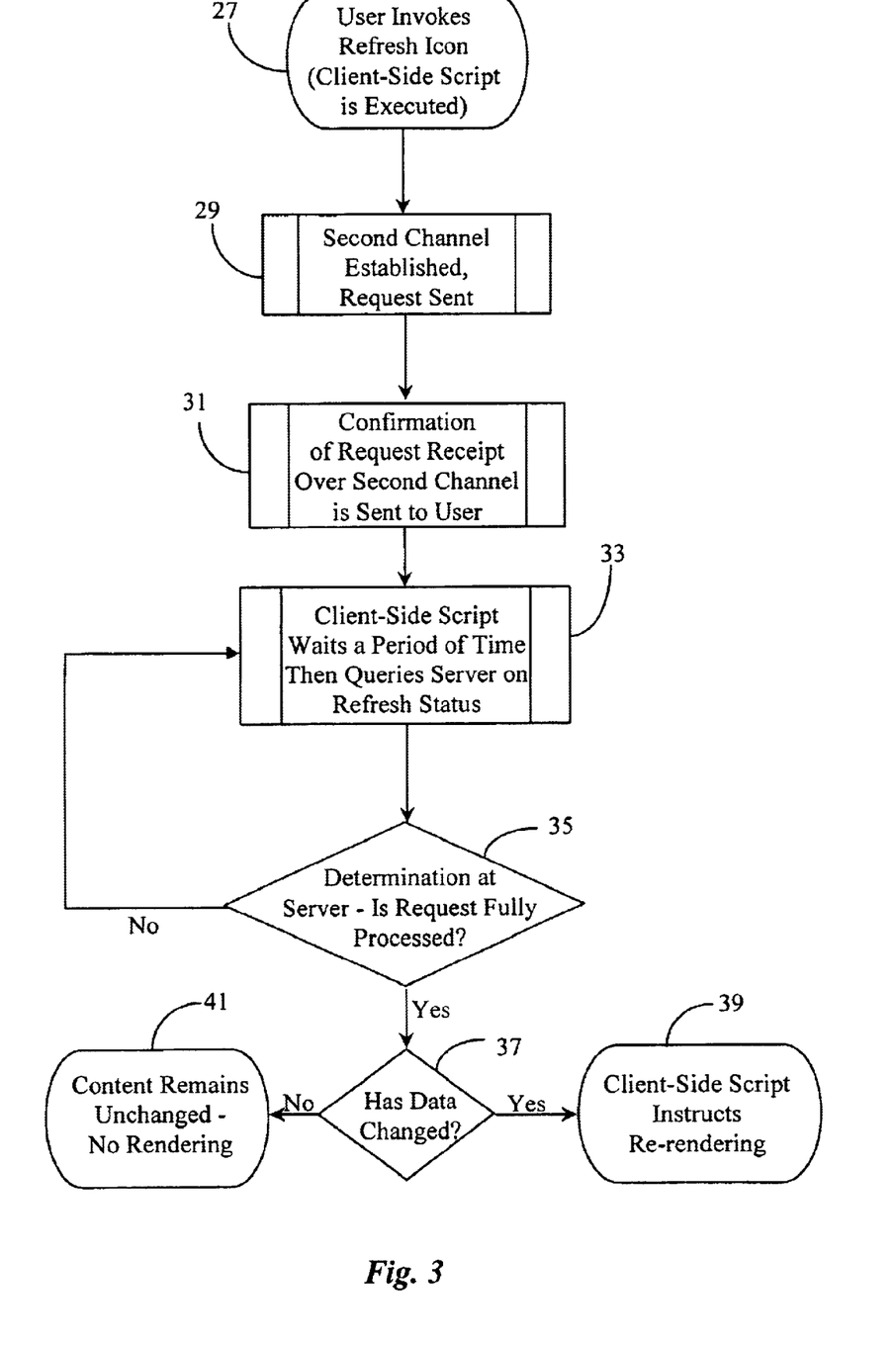
FIG. 3 is a process-flow diagram illustrating interaction between a client and a server during a refresh operation.

FIG. 3 is a process-flow diagram illustrating interaction between a client and a server during a refresh operation according to an embodiment of the present invention. At step 27, a user invokes a refresh operation through interaction with an embedded script-update icon as described in FIG. 2A. In this step, a client-side script is executed and a second data channel is established between the user and a content-providing WS. At step 29, a refresh request is sent to the WS over the newly opened the data channel. At step 31, the WS sends confirmation of receipt of the request back to the user over the newly-established data channel. At this point, the content-providing WS begins processing the refresh request sent in step 29.

If WS is a data aggregation server, it may be required to check and obtain data from a plurality of data servers connected to the network. Moreover, a certain amount of internal processing may be required of the WS in order to organize and aggregate any new data for transmission back over the second data channel. If a content-providing WS is a typical file server and obtains new data from its own internal data source, then the amount of time required to process a refresh request may be considerably less then when a plurality of data sources are involved.

In either case, at step 33, client-side script invoked through interaction with icon 19 waits a predetermined period of time and then queries the WS on current status of the request over the second data channel. At step 35, it is determined whether or not the refresh request is fully processed at the WS. The WS makes this determination and the result of the determination is communicated back to the client over the second data channel. For example, if the response to the request in step 33 is negative, then step 33 is repeated after a subsequent period of time. This repetitive querying may continue until it is determined that a re-fresh request is fully processed at server end.

If at step 35, it is determined that the refresh request is fully processed, then a second determination is made in step 37 of whether or not there is any new data for updating. The determination of step 37 is made, in a preferred embodiment, at the server end. If there is no new data for updating as determined in step 37, then a notification thereof is transmitted from the WS to the user over the second data channel. In this case, client-side script instructs the active browser window to retain the original Web content and there is no re-rendering of data. By making the determination of step 35 at the server-end, bandwidth may be conserved by not transmitting any refresh data over the second channel.

If it is determined at step 37 that there is new data for updating, then, preferably, only the new data is transmitted to user-cache over the second data channel. At this point, the active browser window is still displaying original (unchanged) content. Client-side script instructs the active window to re-render Web content from cache, which includes any new data. In this way, the time frame for displaying a blank browser window is even further reduced by re-rendering original content from cache along with the newly downloaded updated information. It is important to note here that a re-rendering, in some embodiments is not initiated until all updated data is downloaded into user cache. However, in some embodiments, re-rendering may begin with updated data being streamed to display. A separate memory sector in machine cache may be used to store the refreshed Web-page until it is rendered into window 11.

The above-described process steps may be altered somewhat without departing from the spirit and scope of the present invention. For example, in one embodiment, a step for determining which data elements to include in a refresh request may be provided before step 27. Data elements are defined for the purpose of the specification as individual sections of the Web page that represent logical units of information. This, of course, would apply only to Web pages having a plurality of separate, logical data-elements contained therein. In the case of choosing only specific elements for refresh, server-side processing may be streamlined by virtue of the fact that only chosen data elements are checked for update. In order to select specific data elements for refresh, a user may simply highlight those elements in the original Web content and then invoke an update icon embedded within the content at step 27. It is noted herein, that client-side script contains an instruction that disables re-rendering if in fact there are no data elements that have been changed. In this way, if there are no changes, the browser window will retain original content in displayed fashion. Also, by default, if a user selects portions of two or more logical data elements in overlapping fashion, all of the data elements highlighted albeit only a portion thereof will be targeted for refresh.

In still another embodiment using the data aggregation server described above, several data sources represented on a single Web page may have separate update icons associated therewith such that by invoking an associated icon, only that data element is included in a request. In this case, only updated data for the selected data element is transmitted back to a client over the second data channel.

It will be apparent to one with skill in art that the method and apparatus of the present invention may be practiced on a DPN other than the Internet without departing from the spirit and scope of the present invention. Examples include, but are not limited to, a private WAN, a corporate WAN, a private or corporate LAN, an Intranet network, or any combination thereof as long as Internet protocols are supported. All that is required of a client-side browser application in order to practice the present invention is that it supports scripting, in this case JavaScript, and that it supports establishment of a separate data channel for data communication through execution of an embedded icon.

Refreshing by Sector

In one aspect of the present invention, a browser-control script is provided that enables sectored refreshing of data wherein only the updated portions of a Web page are re-rendered.

Referring now to the example of FIGS. 2A–2C described above, it was taught that by invoking browser-control-script icon 19, a user is enabled to initiate a data refresh such that original Web content 21 continues to remain displayed within browser window 11 until Web content 23 is fully processed and downloaded to user cache memory. In this way, a flash-out period associated with browser window 11 during the refresh operation is eliminated or at least kept to a minimum so as not to distract the user. It was also taught in the priority document that specific data elements may be selected for refresh such that only the selected data elements are processed for update at the server end.

Figure 4A:
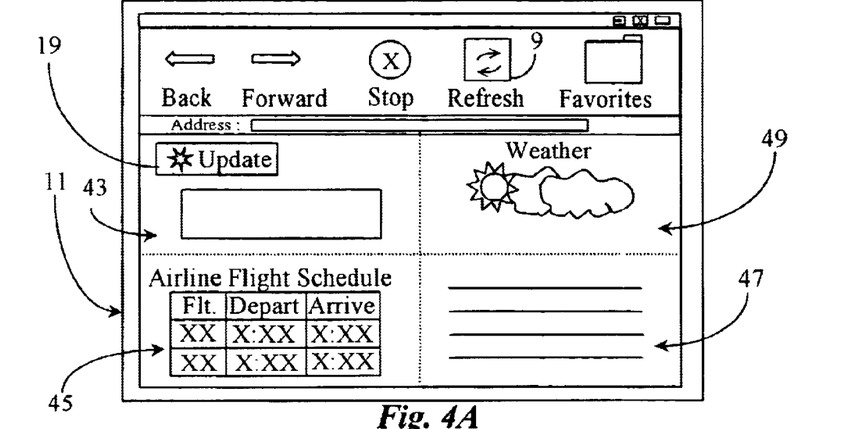
FIG. 4A is a plan view of a browser window displaying separate data elements of Web content that may be separately refreshed and re-rendered according to an embodiment of the present invention.
Figure 4B:
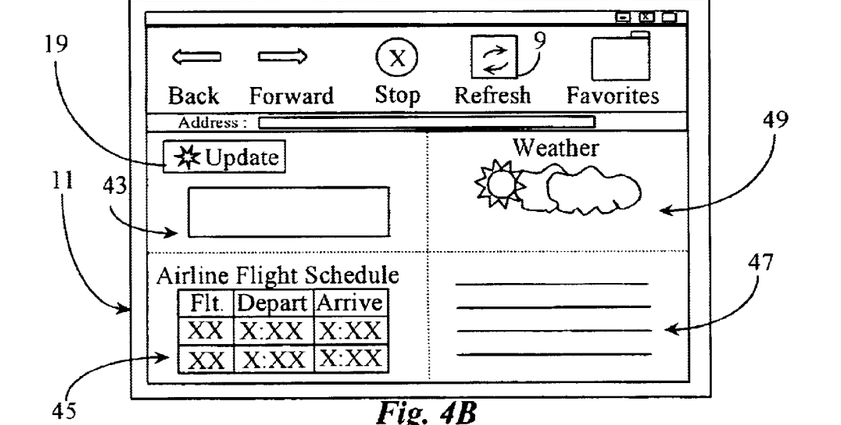
FIG. 4B is a plan view of the browser window and Web content of FIG. 4A during a sectored refresh process before data rendering.
Figure 4C:
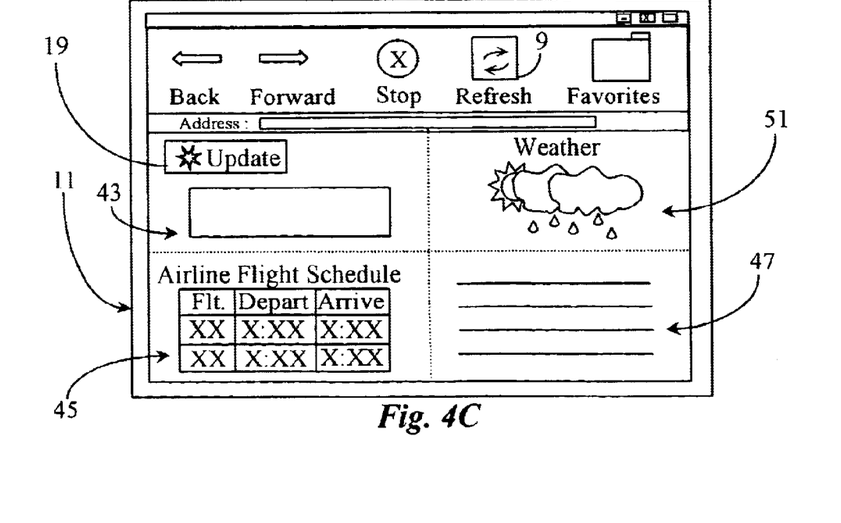
FIG. 4C is a plan view of the browser window of FIG. 4A wherein one data element has been updated and re-rendered according to an embodiment of the present invention.

FIGS. 4A–4C illustrate a single refresh operation invoked for separate, logical data elements that may be contained within a Web page wherein only the selected data elements are processed and re-rendered. A data element is defined for purpose of this specification as a logical block of data that is separated from and otherwise not associated with other blocks and data contained on the same web page. Examples include picture elements, data tables, text blocks, and any other data portions that may occupy an expandable HTML structure.

There are functional elements illustrated in the example illustrated by FIGS. 4A–4C that are essentially unchanged from the example illustrated by FIGS. 2A–2C described above. Such elements retain their original element numbers in all figures. Elements which are modified or provided only within the scope of the present invention have new element numbers.

Referring now to FIG. 4A, browser window 11 is illustrated as having a back button, a forward button, a stop button, refresh icon 9, and a favorites button contained within a toolbar as previously described. Similarly, an address box is illustrated directly beneath the described toolbar. Also as described in the previous example, refresh button 9 is not utilized for data refresh in this example.

An enhanced browser-control script is provided and is executable by invoking an update icon 19 within the original Web content displayed in browser window 11. In this example, Web content displayed within browser window 11 contains separate data elements, which are illustrated as logically separated from each other by dotted division lines. These separate data elements are a picture element, represented herein by a solid rectangle labeled with element number 43, a weather block 49, an airline flight-schedule 45, and a text block 47. Data elements 43, 45, 47 and 49 represent only those elements which are viewable within window 11 at its current scrolled position. A scroll bar is not shown in this example but may be assumed to be present. One with skill in the art will recognize that there may be many additional data elements present but not viewable within window 11.

In this example, each data element 43, 45, 47 and 49 represent an exemplary chunk of data that has been obtained from a separate network-connected data source and aggregated or summarized for display on behalf of a subscribing user. In this case, a content-providing Web server (WS) may be assumed to be a data-gathering and summarization/aggregation server. In accordance with HTML protocol, each data element 43, 45, 47 and 49 is contained within an expandable HTML structure. Therefore, it should be recognized that airline flight schedule 45 may, in some embodiments, contain many more listed flight schedules then the two entries illustrated in this example. Such is the case with each separate data element illustrated.

Icon 19 is provided as previously described above for enabling a user to refresh data contained within browser window 11 by virtue of invocation by a user. Browser-control script executed by selecting icon 19 establishes a dedicated data channel for processing a refresh request. The script, once executed, also instructs browser window 11 to retain original Web content during data refresh processing and transmission of updated data.

What is novel in the present invention beyond the browser-control script executed by icon 19 of FIGS. 2A–2C, it that an additional mechanism (machine-readable script) is provided within the browser-control script that prevents browser application 11 from re-rendering any original Web content that is not updated during a refresh request process. In addition, the new and unique mechanism contains an instruction for correcting the original scrolled position of Web content within window 11 so that a scroll shift is not evident to a user during the refresh process. More detail regarding the enhanced functionality provided through execution of the scripts invoked by icon 19 is provided below.

Referring now to FIG. 4B, it may be assumed that icon 19 has been selected by a user initiating a refresh request. In one embodiment, a user may simply initiate icon 19 thereby ordering an update for all of the Web content comprising the web page displayed within browser window 11. In this case, no data elements are pre-selected for updating. Therefore, a content-providing server processes the request for all of the data elements contained within the Web page displayed in this example. A separate data channel is opened between the client and a content-providing Web server (WS) as previously described.

Browser application 11 continues to display original Web content at its currently viewed position until all data elements are checked for updated data and until all updated data elements are transmitted from the content-providing server to the client over the dedicated second data channel. However, only data elements containing updated data will be re-rendered by browser application 11 once processing is complete. All data elements which are found to remain unchanged are not re-rendered.

Browser application 11, by virtue of provided instruction through execution of the script invoked by icon 19, will predict a new scroll position in a case where a data element is updated above a users current scrolled position and the updated data element or elements command more or less real estate of the Web page than did the original data elements before the executed request. This predictive scroll shift occurs just before the new data element or elements are inserted into the Web page displayed in browser window 11.

Required size information associated with the updated element or elements is obtained either during receipt of the updated element or elements over the second data channel, or from cache memory immediately after the element or elements have been stored but before they are rendered. In this way, a user may continue to view original data without being interrupted by a scroll shift during data re-rendering, unless of course, the particular data element a user is viewing is subject to update. If there are no updated data elements rendered above a user's current scrolled position, then the predictive scroll-shift feature does not predict a scroll shift.

Referring now to FIG. 4C, a weather block 51 is illustrated within browser window 11 and represents an updated version of weather block 49 of FIG. 4B. It may be assumed in this example that the refresh request has been completely processed including re-rendering of updated data elements. In this case, data element 51 occupies the same real estate as data element 49 of FIGS. 4 A–C therefore, the predictive scroll shift was not required. If a user was engaged in reading text block 47 of FIG. 4B during processing of a refresh request, and updated weather block 51 of FIG. 4C commanded significantly more real estate than did weather block 49, then the predictive scroll-shift instruction would apply in the execution allowing the user to continue reading text block 47 at the same position within window 11.

In another embodiment, a user may select specific data elements for updating. In this case, a content-providing server will only check selected data elements for any updated data. By selecting specific data elements for updating, a user may be assured that his engagement with a particular data element will not be interrupted by his updating other elements contained within the same Web page. Moreover, selective processing of data elements at the server end can be achieved more efficiently than blanket checking and processing of all data elements of a Web page.

It will be apparent to one with skill in the art that the enhanced mechanism for enabling selective rendering and predictive scroll-shifting according to an embodiment present invention may be provided in the form of a Java script routine integrated with the routine executed through invocation of icon 19 of FIGS. 2A–2C above without departing from the spirit and scope of the present invention. It will also be apparent that server knowledge of pre-selected data elements for updating during a refresh request may be communicated over the second data channel and understood by a compatible routine executing on the server without departing from the spirit and scope the present invention. Because refresh icon 9 and its default instruction is bypassed by virtue of icon 19, all default browser operation concerning a typical refresh instruction is similarly bypassed. Therefore, the enhancement provided according to the method and apparatus the present invention may be applied to most browser applications without conflict.

In one embodiment of the present invention, a separate icon 19 may be provided within each sectored data-element contained within Web content displayed in window 11. In another embodiment, the user may select individual data elements for update and then invoke a single icon 19. In an embodiment wherein an update icon 19 is embedded within each separate data element, it is possible that a separate data channel is also provided for each data element such that each data element has its own data channel. There are many possibilities.

Figure 5:
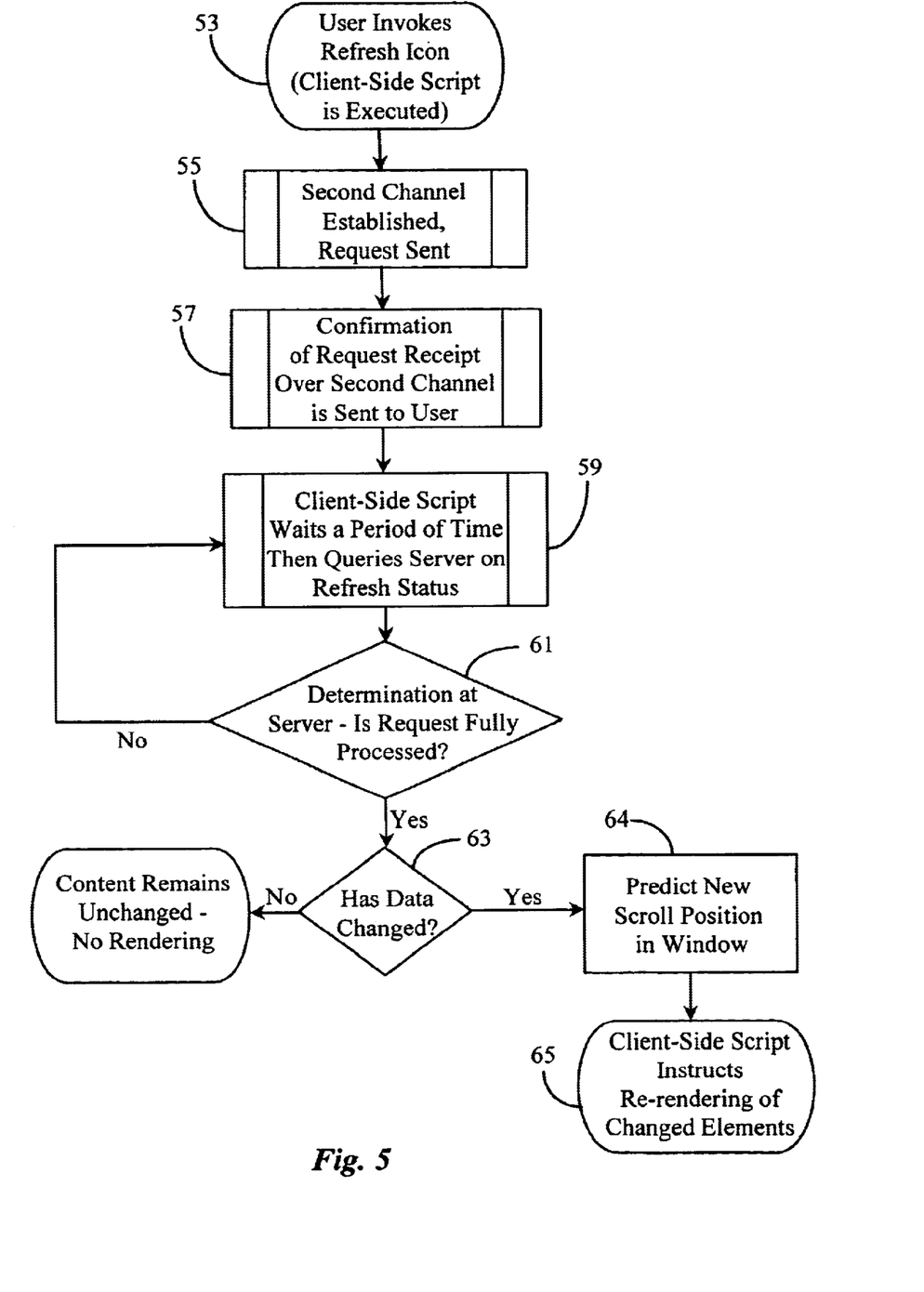
FIG. 5 is a process-flow diagram illustrating various process steps of a sectored data refresh operation according to an embodiment of the present invention.

FIG. 5 is a process-flow diagram illustrating various process steps of a sectored data-refresh operation according to an embodiment of the present invention. At step 53, the user invokes an update icon embedded within Web content to initiate a data-refresh request and client-side script is executed. Also in this step, there may be a sub step for pre-selecting individual data elements for updating. In this case, the described sub step would be performed before actual invocation of an update icon.

At step 55, the second data channel is established between the content-providing server and the client according to a first instruction of the executed script. In this step, the refresh request is sent from the client to the content-providing server over the second channel.

At step 57, confirmation of the request being received at the content-providing server is sent back to the requesting user over the dedicated second data channel. At step 59, client side script queries the content providing server on a periodic basis as to the status of the refresh request. At step 61, a determination is made at the content providing server when a request is fully processed. Notification thereof is sent to the requesting user over the second data channel as a response to a query at step 59. If it is determined after a query in step 59 at a data request is not fully processed at the server end, then step 59 will be repeated after a pre-defined period. This communication exchange may be repeated until it is confirmed that a request is fully processed at the server end.

At step 63, it is determined whether or not there are actually any data elements of the original request which have been updated. This step is also determined at the server end and may be communicated in conjunction with the determination of step 61 in a same transmission over the second data channel. If it is determined in step 63 that there are no updated data elements to transmit to the requesting client, then no Web data is sent from the content-providing server to the client and Web content still visible in a requesting browser window remains unchanged (no data re-rendering) at step 67.

If it is determined in step 63 that there are updated data elements for transmission to the requesting client, then the updated elements are sent to the client over the second data channel. At step 64 a new scroll position is determined to avoid the problem of the portion of a page a client might be viewing moving when refreshed data is displayed. The new elements are re-rendered within the requesting browser application in place of the old data elements at step 65. It is noted herein that step 63 may be included in step 61 if it is determined that processing is complete at the server end. Likewise, updated data may be sent over the second data channel with the confirmation of the data update. Original data elements that were not included in an update request or were included but remained unchanged during request processing are not re-rendered within the requesting browser window. Moreover, a progress bar similar to known indicators that illustrates a software download or installation process may be present in some convenient location on the active browser window to indicate the current progress of processing refreshed data.

The method and apparatus of the present invention can be practiced in conjunction with various types of DPN'S, as well as with virtually any type of browser application that supports scripting and establishment of secondary data channels. Therefore, the method and apparatus of the present invention should be afforded a broad scope under examination. The spirit and scope of the present invention is limited only by the claims that follow.

What is claimed is:

1. A browser-control script for controlling how refreshed data is rendered during a network data-session comprising:
   a function for establishing a second data-channel between a client and a data source;
   a data-communication function for transacting data over the second data-channel;
   a function for enabling selective data-rendering by the browser-control script;
   a selection function for selecting data elements to be refreshed; and
   a function for predicting a new scroll position in a browser window;
   wherein once invoked, the browser-control script provides an automated control-routine for managing a data-refresh operation such that data re-rendering within the browser application only occurs when there are updated data elements ready for display, and wherein display does not move the position of elements in the previous display.

2. The browser control-script of claim 1, wherein the control script is of the form of an embedded executable program.

3. The browser control-script of claim 2, wherein the control script is embedded into a Web page.

4. The browser control-script of claim 3, wherein the network is the Internet network.

5. The browser control-script of claim 4, wherein the control script is a Java Script program.

6. The browser control-script of claim 5, wherein the data source is a network-connected Web server.

7. The browser control-script of claim 5, wherein there is more than one data source from whence data is compiled and aggregated by a single network-connected Web server.

8. The browser-control script of claim 7, wherein the instruction for predicting a scroll position contains an action for shifting the scrolled position when an updated data element is re-rendered above a user's viewing position in the browser window.

9. The browser-control script of claim 8, wherein the control-script obtains size information of updated data elements during transmission of the data elements from the server to the client.

10. The browser-control script of claim 9 wherein the size information of updated data elements is obtained from client cache memory after receipt of the updated data elements but before rendering the elements.

11. A method for conducting the data-refresh operation during an active data session conducted over a data network comprising the steps of:
    (a) establishing a second data channel between a client and a data source operating on a network using a first data channel;
    (b) sending a data-refresh request from the client to the data source over the second data channel;
    (c) instructing the browser application to continue display of the original content received over the first data channel while the data-refresh request is in process;
    (d) receiving updated data sent from the data source to the client over the second data channel;
    (e) determining a new scroll position for displayed data; and
    (e) instructing the browser application to render the updated content only after new content is received and renderable.

12. The method of claim 11, wherein the network is the Internet network.

13. The method of claim 12 wherein in step (a), the second data channel is used for background data transactions.

14. The method of claim 13 wherein in step (a), the second data channel is established by virtue of invoking an executable control icon embedded within the original Web content.

15. The method of claim 14 wherein in steps (c) and (e), instruction is Java Script executed by invoking the control icon.

16. The method of claim 15 wherein in a step is added for querying the data source over the second data channel, the query related to the status of a request in process.

17. The method of claim 16 wherein in step (a), the data source is a network-connected Web server and the data is of an HTML class of data.

18. The method of claim 14 wherein in step (a), there is more than one data source from whence data is compiled and aggregated by a single network-connected Web server.

19. The method of claim 18 wherein a step is added for predicting the size of updated data elements and shifting the scrolled position of the browser window during data re-rendering in the event that the re-rendering occurs above the user's viewing position.

* * * * *